United States Patent
Sonwane (10) Patent No.: US 10,467,332 B2
(45) Date of Patent: Nov. 5, 2019

(54) GRAPHICS DISPLAY CAPTURE SYSTEM

(71) Applicant: SAP SE, Walldorf (DE)

(72) Inventor: Tejram Jagannath Sonwane, Bangalore (IN)

(73) Assignee: SAP SE, Walldorf (DE)

( * ) Notice: Subject to any disclaimer, the term of this patent is extended or adjusted under 35 U.S.C. 154(b) by 11 days.

(21) Appl. No.: 15/380,314

(22) Filed: Dec. 15, 2016

(65) Prior Publication Data

US 2018/0173683 A1    Jun. 21, 2018

(51) Int. Cl.
*G06F 17/00*    (2019.01)
*G06F 17/22*    (2006.01)

(52) U.S. Cl.
CPC ...... *G06F 17/2247* (2013.01); *G06F 17/2264* (2013.01)

(58) Field of Classification Search
CPC . G06F 17/2247; G06F 17/2264; G06T 11/203
USPC .................................................. 715/239, 200
See application file for complete search history.

(56) References Cited

U.S. PATENT DOCUMENTS

| | | | |
|---|---|---|---|
| 7,461,335 B2 * | 12/2008 | Yarde ............... | G06F 17/2247 715/234 |
| 8,797,335 B2 | 8/2014 | Muir et al. | |
| 8,797,338 B2 | 8/2014 | Muir et al. | |
| 8,819,540 B2 | 8/2014 | Callaghan et al. | |
| 2007/0089048 A1 * | 4/2007 | Lacey .................. | G06F 9/4443 715/234 |
| 2009/0195553 A1 * | 8/2009 | Mathew ............... | G06T 11/203 345/619 |
| 2010/0172594 A1 * | 7/2010 | Priddle ................. | G06T 11/00 382/253 |
| 2014/0133760 A1 * | 5/2014 | Chao ..................... | G06T 11/203 382/197 |
| 2016/0321218 A1 * | 11/2016 | Farncombe .......... | G06F 17/227 |
| 2017/0109325 A1 * | 4/2017 | Sanghai ............... | G06F 17/211 |

OTHER PUBLICATIONS

Inkfood, "SVG to Canvas", published Apr. 12, 2014, located at http://www.inkfood.com/svg-to-canvas/, pp. 1-2.*

* cited by examiner

*Primary Examiner* — Manglesh M Patel
(74) *Attorney, Agent, or Firm* — Schwegman Lundberg & Woessner, P.A.

(57) ABSTRACT

Methods, systems, and computer program products for capturing graphical display data are described. Selected graphical display data containing one or more SVG components and one or more non-SVG components is accessed and the one or more SVG components are identified. Each SVG component is converted to a canvas component and the selected graphical display data is revised by replacing each SVG component of the selected graphical display data with the corresponding converted canvas component. The revised graphical display data is converted to a canvas format.

14 Claims, 9 Drawing Sheets

GRAPHICS DISPLAY CAPTURE SYSTEM

FIELD

The present disclosure relates generally to capturing display data. In an example embodiment, the disclosure relates to capturing graphics, including text and images, generated for a display screen.

BACKGROUND

Applications, such as web browsers, conventionally render data for display to a user. The data may be created in accordance with various formats, such as the document object model (DOM), scalable vector graphics (SVG), canvas, and the like. Once the data is displayed, a user may choose to capture a "screen shot" of the display in order to store, review, and share the displayed data.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and computing program products that embody example embodiments of the present invention. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

Generally, methods, systems, apparatus, and computer program products for capturing graphical display data are described. In one example embodiment, SVG components in a displayed image are extracted and converted to canvas components. The SVG components in the displayed image are replaced with the canvas components. The displayed image is processed with an application that converts the non-SVG components of the image to canvas components. The canvas components that were generated from the SVG components are then replaced with the original SVG components and the comprehensive image is provided for use.

In one example embodiment, the original screen shot of the displayed image is obtained from a web-based tool and is based on the DOM. The DOM is a cross-platform and language-independent application programming interface that treats an HTML, Extensible Hypertext Markup Language (XHTML), or Extensible Markup Language (XML) document as a tree structure wherein each node is an object representing a part of the document. The objects can be manipulated programmatically and any visible changes occurring as a result may then be reflected in the display of the document. (See "Document Object Model (DOM)", http://www.w3.org/: W3C. Retrieved 2012-01-12.)

SVG is a language for rich graphical content and for defining (two-dimensional) graphics in XML. SVG supports a variety of graphical objects, such as vector graphic shapes, text, and images. The graphical objects can be grouped, styled, transformed, and composited into previously rendered objects. The feature set includes nested transformations, clipping paths, alpha masks, filter effects, and template objects. Sophisticated applications of SVG are possible by use of a supplemental scripting language which accesses SVG DOM, which provides complete access to all elements, attributes, and properties. Limited bitmap manipulation functionality is available for SVG. (See "SVG 1.1 (Second Edition)" https://www.w3.org/TR/SVG/intro.html)

Canvas provides for scriptable rendering of shapes and (two-dimensional) bitmap images, and is raster-based. A canvas component is a low-level model defined in HTML5. Each canvas component has height and width attributes. Canvas also provides for creating content in layers. JavaScript libraries are also available that add scene-graph capabilities to the canvas component.

In contrast to canvas, SVG is vector-based; each shape is stored as an object in a DOM or scene graph. The DOM or scene graph may be rendered to a bitmap. Since the SVG object is rendered by, for example, a browser, changes to the attributes of the SVG object are easily handled when the object is rendered. The models which canvas objects are drawn from, however, are not maintained by the system. Thus, if, for example, the position of a shape was changed, the image would need to be redrawn, including the objects affected by the change in position of the shape. This is not the case in SVG, where changes to the position attributes of a shape would be easily handled during the rendering of the image.

Applications are available to convert HTML to canvas and to convert SVG components to canvas components. For example, the application programming interface (API) HTML2CANVAS (see html2canvas.hertzen.com) provides a script to acquire "screen shots" of webpages or portions of webpages on a browser (where the screen shot is based on the DOM). The API HTML2CANVAS, as presently defined, does not capture SVG components that reside in the screen shot.

The API CANVG (see https://github.com/canvg/canvg) converts SVG components to canvas, and converts the canvas result to an image. The API CANVG is essentially an SVG parser and renderer that takes, for example, a URL for an SVG file or the text of an SVG file as input. The input is parsed in JavaScript and the result is rendered as a canvas element. The API CANVG, as presently defined, processes only SVG components.

Figure 1A:
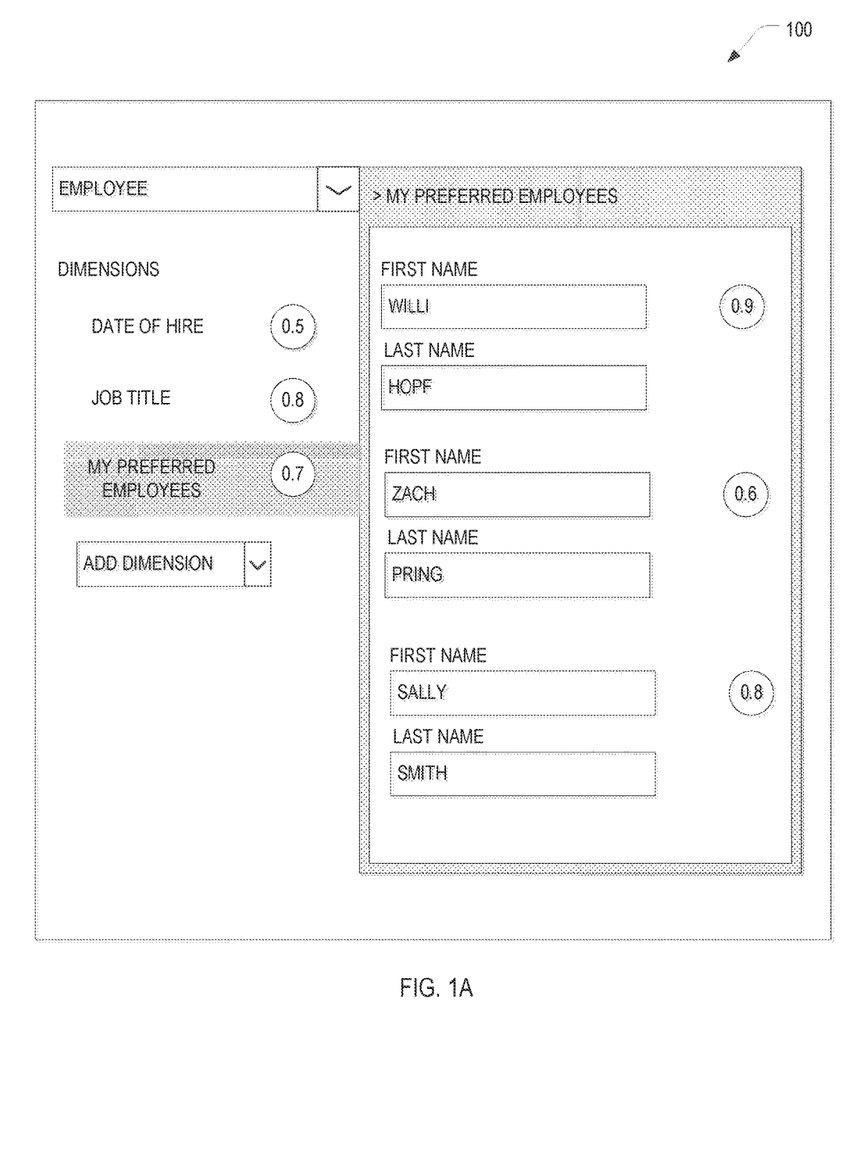
FIG. 1A is a screen shot captured using a function of the operating system of a processing system, in accordance with an example embodiment.

FIG. 1A is a screen shot 100 captured using a function of the operating system of a processing system, in accordance with an example embodiment. In some situations, such as the use of a web-based tool, the screen capturing functionality of the operating system cannot be used. While an HTML-to-canvas application may be used to capture a screen shot for a web-based tool (as described above), it does not properly capture SVG components.

Figure 1B:
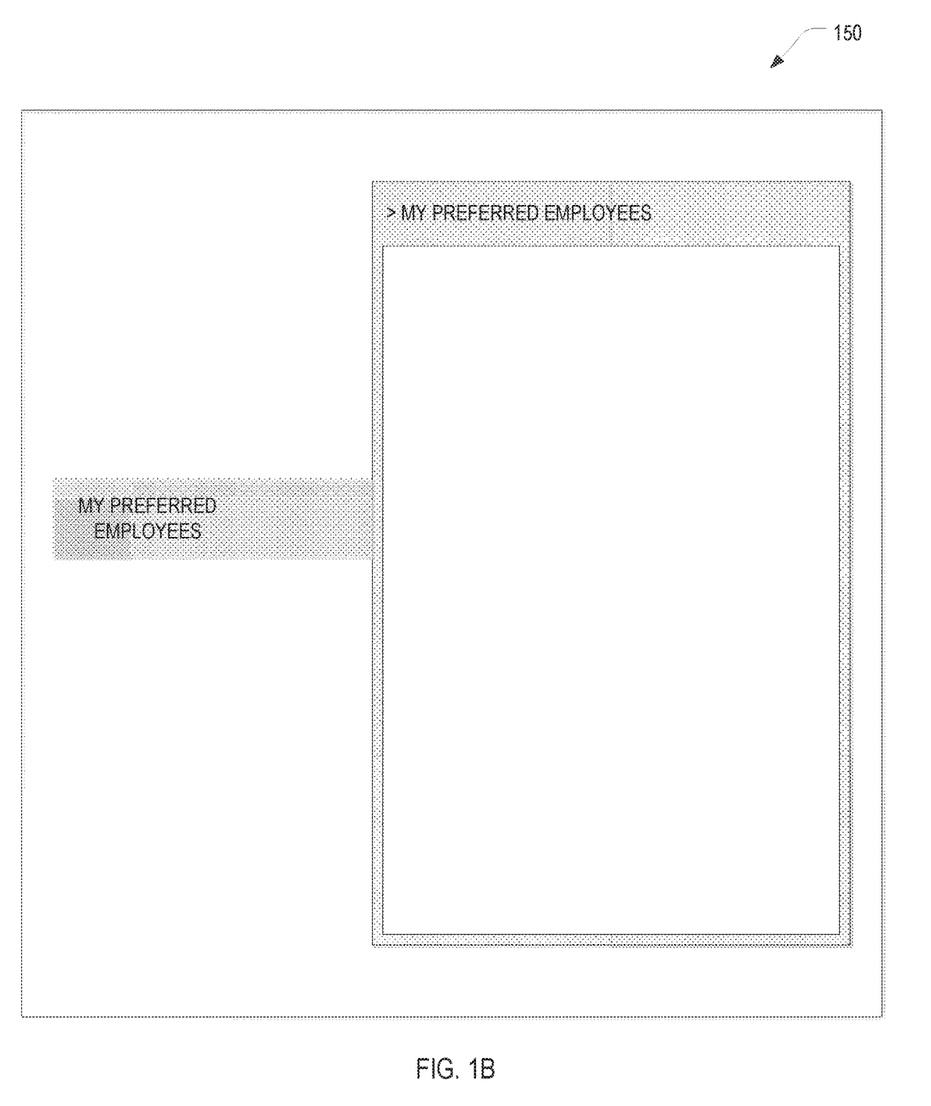
FIG. 1B is a screen shot captured using a Hypertext Markup Language (HTML)-to-canvas application, in accordance with an example embodiment.

FIG. 1B is a screen shot 150 captured using an HTML-to-canvas application (such as the API HTML2CANVAS), in accordance with an example embodiment. As illustrated in FIG. 1B, only a portion of the screen shot elements are captured. Moreover, the captured data is not an actual screen shot, but is built based on the information available on the page. Although an SVG-to-canvas conversion application may be used to convert the SVG components to canvas components, it is not trivial to create a composite image of the two screen shots created using the HTML-to-canvas and the SVG-to-canvas conversion applications. Since both applications return new screen images, the position and dimensions of the SVG component(s) are not known and, thus, creating the composite image is not trivial.

Figure 2:
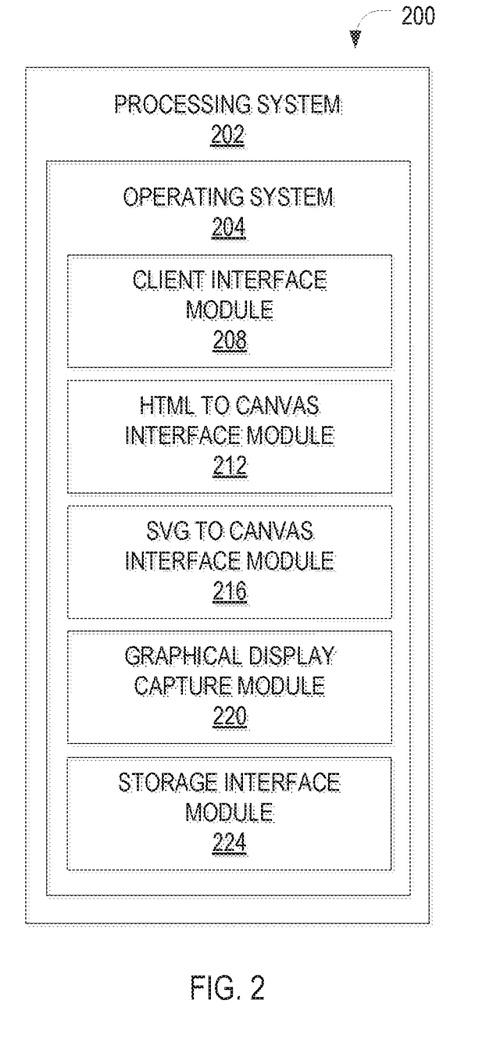
FIG. 2 is a block diagram of an example apparatus for capturing graphical display data, in accordance with an example embodiment.

FIG. 2 is a block diagram of an example apparatus 200 for capturing graphical display data that contains SVG and non-SVG elements, in accordance with an example embodiment. The apparatus 200 is shown to include a processing system 202 that may be implemented on a client or other processing device, and that includes an operating system 204 for executing software instructions.

In accordance with an example embodiment, the apparatus 200 may include a client interface module 208, an HTML-to-canvas interface module 212, an SVG-to-canvas interface module 216, a graphical display capture module 220, and a storage interface module 224.

The client interface module 208 receives a user request to capture a screen shot and forwards the request to, for example, the graphical display capture module 220. The client interface module 208 may generate a user interface, such as the user interface described below by way of example in conjunction with FIG. 5, to enable a user to initiate the capture of a screen shot and to view a list of files containing the graphical display data of previously captured screen shots.

The HTML-to-canvas interface module 212 provides an interface for the graphical display capture module 220 to access applications that convert HTML to canvas. The SVG-to-canvas interface module 216 provides an interface for the graphical display capture module 220 to access applications that convert SVG to canvas.

The graphical display capture module 220 captures graphical display data and generates an image file. For example, the graphical display capture module 220 may utilize an application that converts SVG to canvas to convert the SVG components of the original screen shot, and may then replace the SVG components with the converted canvas components. The graphical display capture module 220 may then use an application that converts HTML to canvas to convert the revised graphical display data to canvas. The graphical display capture module 220 may then generate the image file, as described more fully below by way of example in conjunction with FIGS. 3A and 3B.

The storage interface module 224 provides an interface to a database or other data structure for storing and accessing the SVG map, the canvas map, and the generated image files.

Figure 3A:
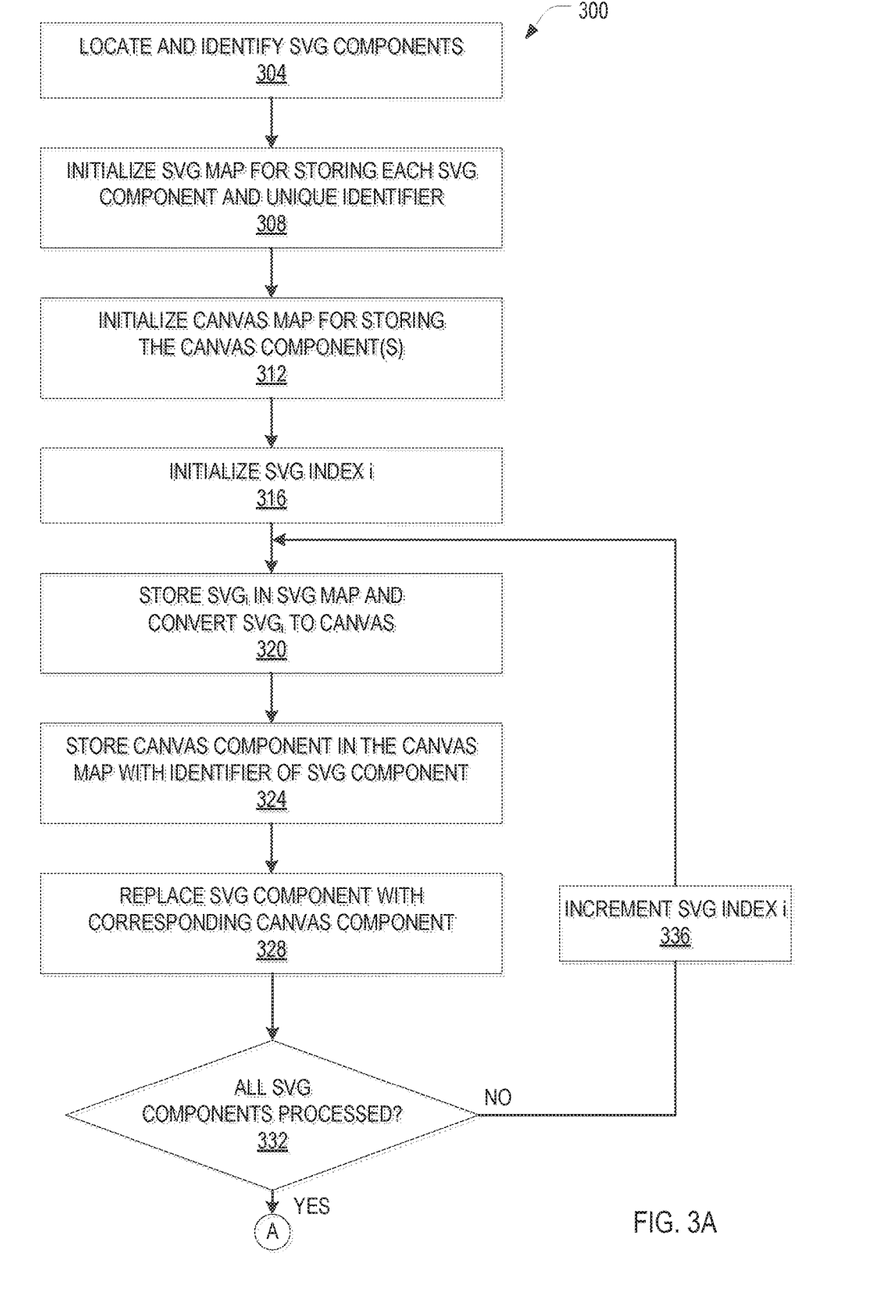
FIGS. 3A and 3B are a flowchart of an example method for capturing graphical display data that contains SVG and non-SVG elements, in accordance with an example embodiment.
Figure 3B:
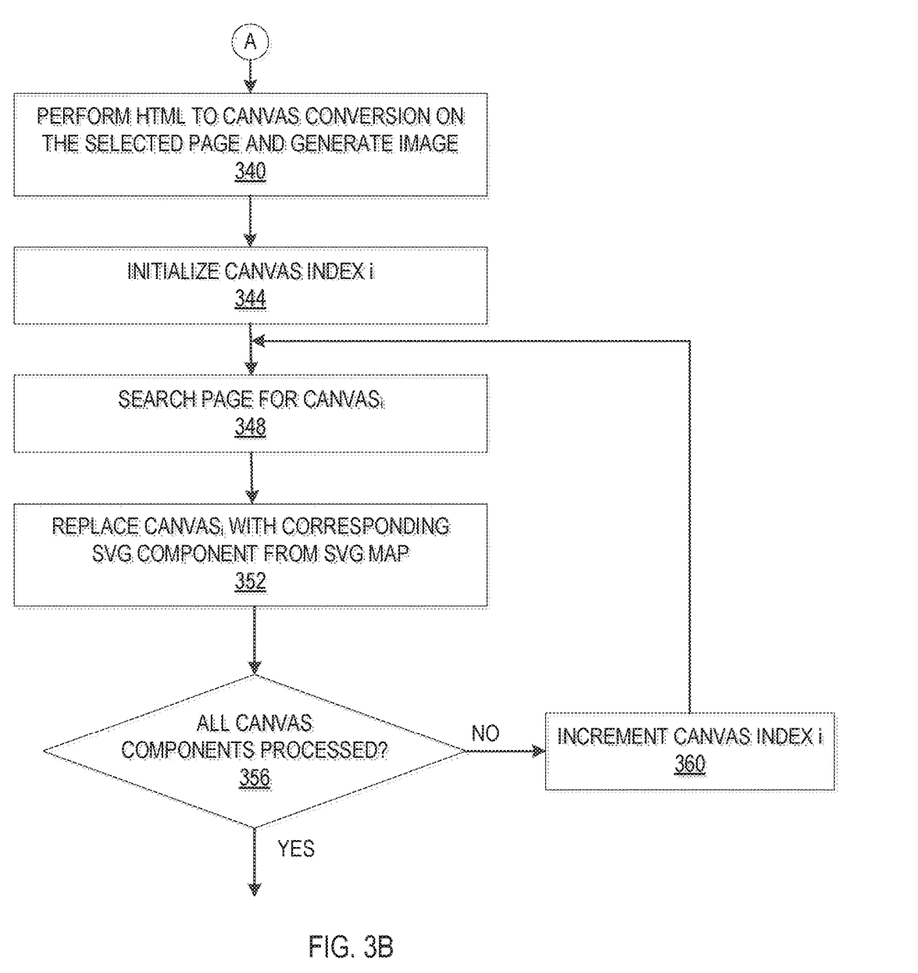

FIGS. 3A and 3B are a flowchart of an example method 300 for capturing graphical display data that contains SVG and non-SVG elements, in accordance with an example embodiment. In one example embodiment, the graphical display data is obtained and the SVG component(s) within the graphical display data are located and identified (operation 304). An SVG map is initialized to store each SVG component with a corresponding unique identifier (operation 308), and a canvas map is initialized to store the canvas components that are created from the SVG components (operation 312). Each map is, for example, a table that contains a row for each component, where each row includes the SVG or canvas component and the corresponding unique identifier. An SVG index (i) that is used to access the SVG components in the SVG map is initialized to one (operation 316).

The $i^{th}$ SVG component ($SVG_i$) identified during operation 304 is stored in the SVG map and converted to a canvas component (operation 320). For example, an SVG-to-canvas application may be accessed via the SVG-to-canvas interface module 216 to convert the SVG component. The canvas component is then stored in the canvas map with the same unique identifier as the corresponding SVG component (operation 324). The SVG component of the graphical display data is replaced with the corresponding canvas component generated during operation 320 (operation 328).

A test is performed to determine if all the SVG components in the SVG map have been processed (operation 332). If all the SVG components have been processed, the method 300 proceeds with operation 340; otherwise, the SVG index is incremented (operation 336) and the method 300 proceeds with operation 320.

During operation 340, the HTML-to-canvas application is executed on the revised graphical display data and an image is generated. For example, an HTML-to-canvas interface application may be accessed via the HTML-to-canvas interface module 212 to convert the revised graphical display data. A canvas index i is initialized to one (operation 344) and a search is executed on the graphical display data for the $i^{th}$ canvas component ($canvas_i$) (operation 348). For example, the $i^{th}$ canvas component ($canvas_i$) may be retrieved from the canvas map and compared to the canvas components of the revised graphical display data. The identified canvas component of the selected graphical display data is replaced with the corresponding SVG component from the SVG map as identified, for example, by the unique identifier (operation 352).

A test is performed to determine if all the canvas components in the canvas map have been processed (operation 356). If all the canvas components in the canvas map have been processed, the method 300 ends; otherwise, the canvas index is incremented (operation 360) and the method 300 proceeds with operation 348.

Figure 4:
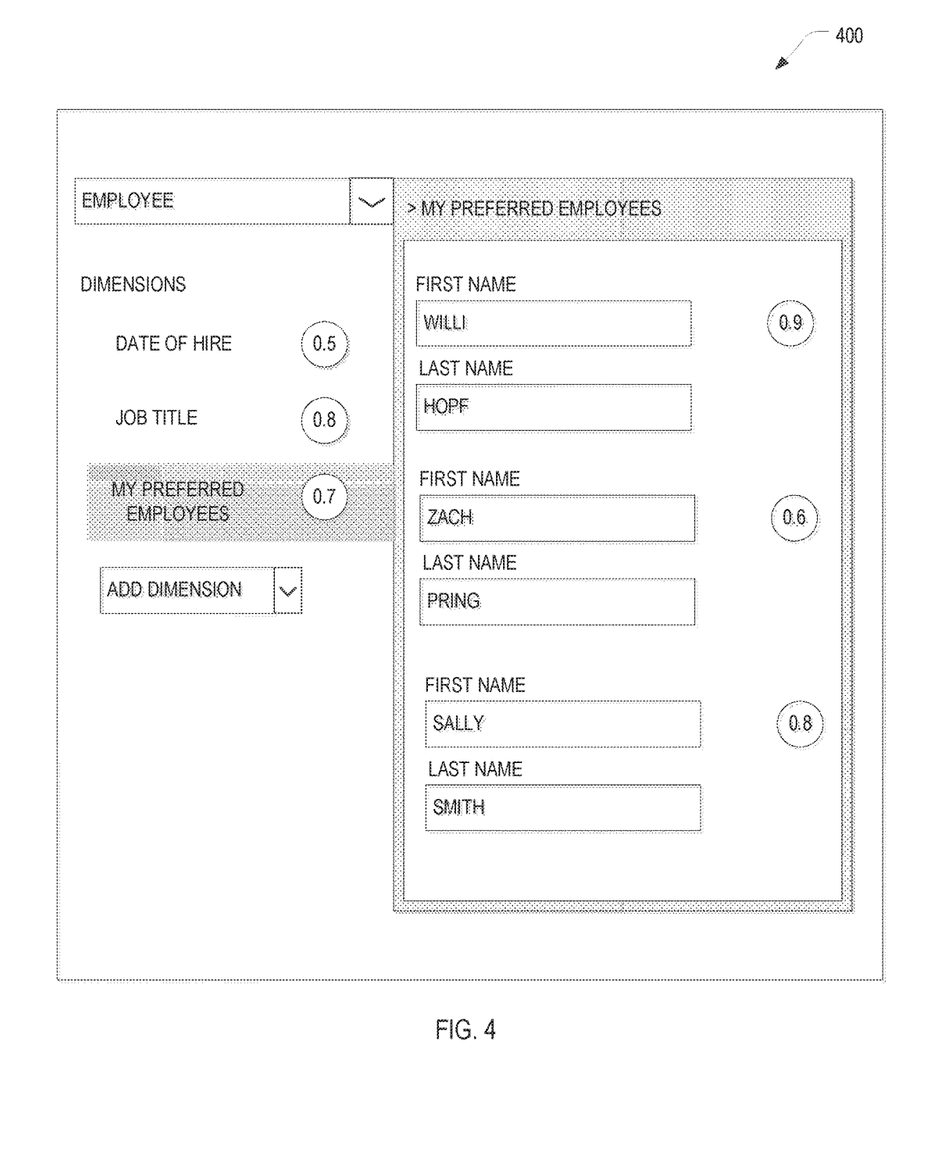
FIG. 4 is a screen shot captured using the method of FIGS. 3A and 3B, in accordance with an example embodiment.

FIG. 4 is a screen shot 400 captured using the method 300 of FIGS. 3A and 3B, in accordance with an example embodiment. The screen shot 400 substantially matches the original screen shot 100.

Figure 5:
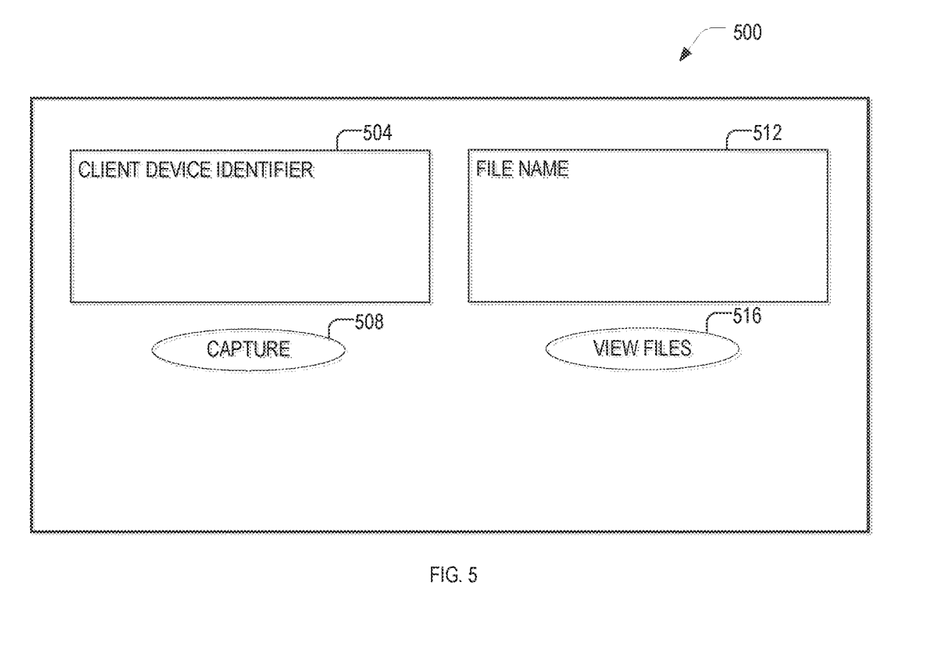
FIG. 5 is an example user interface for initiating the capture of graphical display data, according to an example embodiment.

FIG. 5 is an example user interface 500 for initiating the capture of graphical display data, according to an example embodiment. In one example embodiment, the user interface 500 is provided by the client interface module 208.

The user interface 500 includes a client device identifier field 504 for entering the name of the client device on which the screen shot is to be captured and a file identifier field 512 for entering the name of the captured image file. If the client device identifier field 504 is left blank, the client device providing the user interface 500 is designated as the default client device on which the screen shot is to be captured. A capture button 508 may be selected to initiate the capture of the screen shot and the generation of the image file. Once the screen shot is captured, the name of the captured image file (and other related image files) may be displayed in the file identifier field 512 by selecting a view files button 516.

Figure 6:
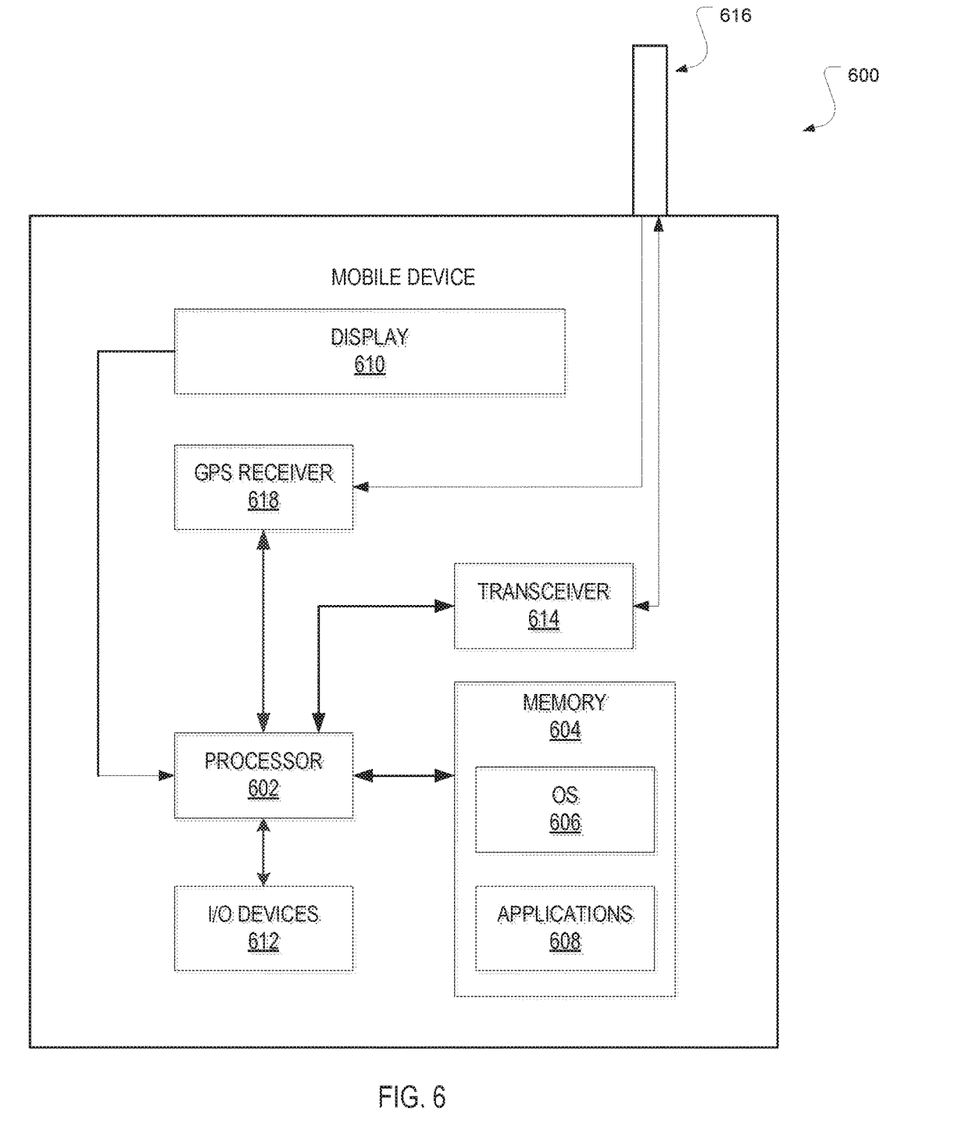
FIG. 6 is a block diagram illustrating a mobile device, according to an example embodiment.

FIG. 6 is a block diagram illustrating a mobile device 600, according to an example embodiment. The mobile device 600 can include a processor 602. The processor 602 can be any of a variety of different types of commercially available processors suitable for mobile devices 600 (for example, an XScale architecture microprocessor, a microprocessor without interlocked pipeline stages (NIPS) architecture processor, or another type of processor). A memory 604, such as a random access memory (RAM), a flash memory, or another type of memory, is typically accessible to the processor 602. The memory 604 can be adapted to store an operating system (OS) 606, as well as applications 608, such as a mobile location-enabled application that can provide location-based services (LBSs) to a user. The processor 602 can be coupled, either directly or via appropriate intermediary hardware, to a display 610 and to one or more input/output (I/O) devices 612, such as a keypad, a touch panel sensor, and a microphone. Similarly, in some embodiments, the processor 602 can be coupled to a transceiver 614 that interfaces with an antenna 616. The transceiver 614 can be configured to both transmit and receive cellular network signals, wireless data signals, or other types of signals via the antenna 616, depending on the nature of the mobile device 600. Further, in some configurations, a global positioning system (GPS) receiver 618 can also make use of the antenna 616 to receive GPS signals.

Figure 7:
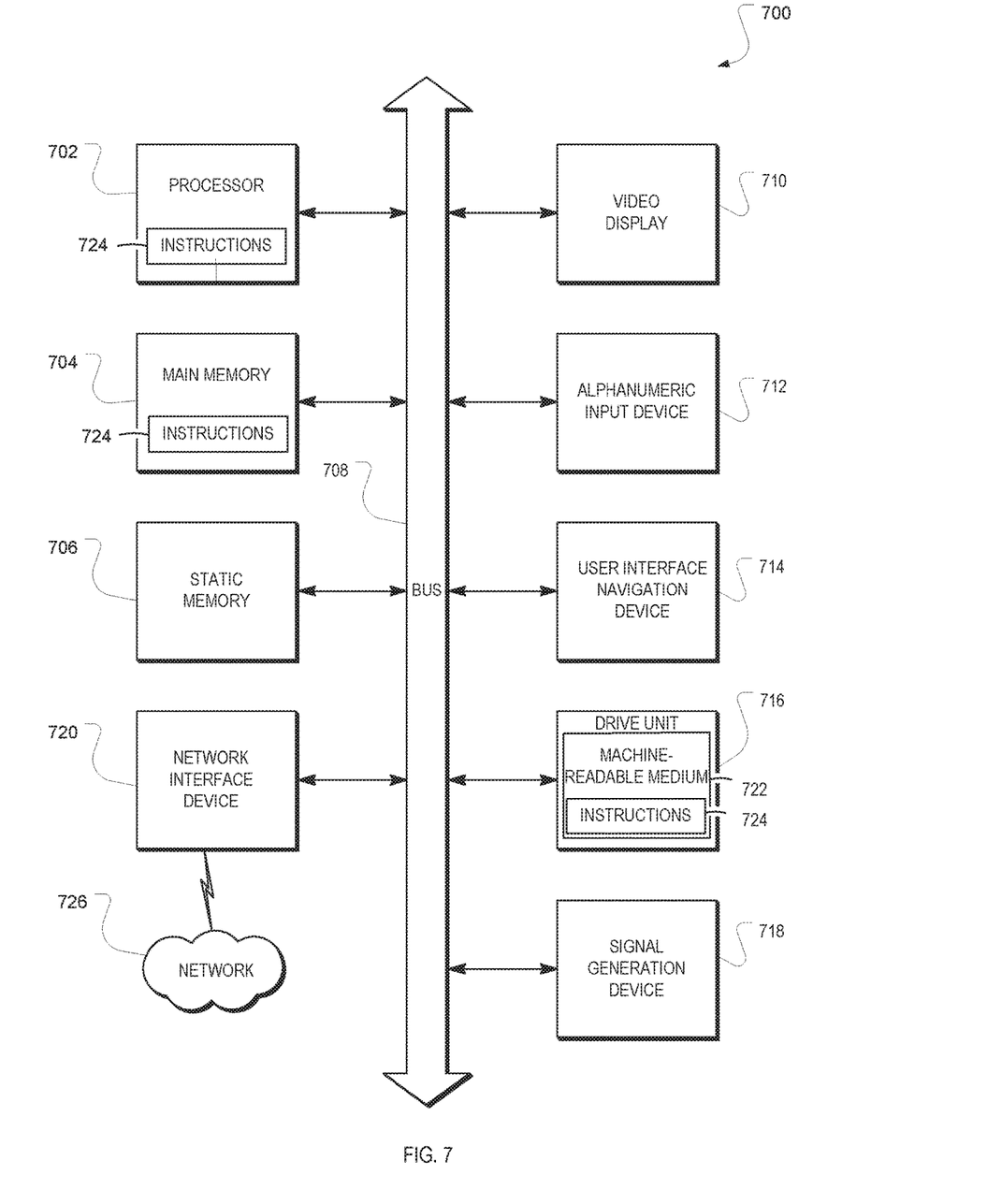
FIG. 7 is a block diagram of a computer processing system within which a set of instructions may be executed for causing a computer to perform any one or more of the methodologies discussed herein.

FIG. 7 is a block diagram of a computer processing system 700 within which a set of instructions 724 may be executed for causing a computer to perform any one or more of the methodologies discussed herein. In some embodiments, the computer operates as a standalone device or may be connected (e.g., networked) to other computers. In a networked deployment, the computer may operate in the capacity of a server or a client computer in server-client network environment, or as a peer computer in a peer-to-peer (or distributed) network environment.

In addition to being sold or licensed via traditional channels, embodiments may also, for example, be deployed by software-as-a-service (SaaS), by an application service provider (ASP), or by utility computing providers. The computer may be a server computer, a PC, a tablet PC, a PDA, a cellular telephone, or any processing device capable of executing a set of instructions 724 (sequential or otherwise) that specify actions to be taken by that device. Further, while only a single computer is illustrated, the term "computer" shall also be taken to include any collection of computers that, individually or jointly, execute a set (or multiple sets) of instructions 724 to perform any one or more of the methodologies discussed herein.

The example computer processing system 700 includes a processor 702 (e.g., a central processing unit (CPU), a graphics processing unit (GPU), or both), a main memory 704, and a static memory 706, which communicate with each other via a bus 708. The computer processing system 700 may further include a video display 710 (e.g., a plasma display, a liquid crystal display (LCD), or a cathode ray tube (CRT)). The computer processing system 700 also includes an alphanumeric input device 712 (e.g., a keyboard), a user interface (UI) navigation device 714 (e.g., a mouse and/or touch screen), a drive unit 716, a signal generation device 718 (e.g., a speaker), and a network interface device 720.

The drive unit 716 includes a machine-readable medium 722 on which is stored one or more sets of instructions 724 and data structures embodying or utilized by any one or more of the methodologies or functions described herein. The instructions 724 may also reside, completely or at least partially, within the main memory 704, the static memory 706, and/or the processor 702 during execution thereof by the computer processing system 700, the main memory 704, the static memory 706, and the processor 702 also constituting tangible machine-readable media 722.

The instructions 724 may further be transmitted or received over a network 726 via the network interface device 720 utilizing any one of a number of well-known transfer protocols (e.g., Hypertext Transfer Protocol).

While the machine-readable medium 722 is shown, in an example embodiment, to be a single medium, the term "machine-readable medium" should be taken to include a single medium or multiple media (e.g., a centralized or distributed database, and/or associated caches and servers) that store the one or more sets of instructions 724. The term "machine-readable medium" shall also be taken to include any medium that is capable of storing, encoding, or carrying a set of instructions 724 for execution by the computer and that cause the computer to perform any one or more of the methodologies of the present application, or that is capable of storing, encoding, or carrying data structures utilized by or associated with such a set of instructions 724. The term "machine-readable medium" shall accordingly be taken to include, but not be limited to, solid-state memories and optical and magnetic media.

While the embodiments of the invention(s) is (are) described with reference to various implementations and exploitations, it will be understood that these embodiments are illustrative and that the scope of the invention(s) is not limited to them. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the invention(s).

What is claimed is:

1. A computerized method, the method comprising:
identifying one or more scalable vector graphics (SVG) components of graphical display data containing the one or more SVG components and one or more non-SVG components;
generating a first converted canvas component corresponding to a first SVG component of the one or more SVG components;
storing the first SVG component to an SVG map in association with a first unique identifier;

replacing the first SVG component of the graphical display data with the first converted canvas component to generate revised graphical display data;
converting the revised graphical display data to canvas format graphical display data;
identifying the first converted canvas component in the canvas format graphical display data;
determining that the first converted canvas component at the canvas format graphical display data is associated with the first unique identifier;
retrieving the first SVG component from the SVG map using the first unique identifier and the SVG map; and
replacing the first converted canvas component from the canvas format graphical display data with the first SVG component.

2. The computerized method of claim 1, further comprising initializing SVG map to store each SVG component and a corresponding unique identifier.

3. The computerized method of claim 2, further comprising initializing a canvas map to store each canvas component.

4. The computerized method of claim 3, further comprising:
storing the first converted canvas component in the canvas map in association with the first unique identifier, wherein determining that the first converted canvas component is associated with the first unique identifier comprises determining that the first converted canvas component is associated with the first unique identifier at the canvas map.

5. The computerized method of claim 1, wherein the one or more SVG components are vector-based and the first converted canvas component is raster-based.

6. An apparatus comprising:
one or more hardware processors;
memory to store instructions that, when executed by the one or more hardware processors perform operations comprising:
identifying one or more SVG components of graphical display data containing the one or more SVG components and one or more non-SVG components;
generating a first converted canvas component corresponding to a first SVG component of the one or more SVG components;
replacing the first SVG component of the graphical display data with the first converted canvas component to generate revised graphical display data;
storing the first SVG component to an SVG map in association with a first unique identifier;
converting the revised graphical display data to canvas format graphical display data;
identifying the first converted canvas component in the canvas format graphical display data;
determining that the first converted canvas component at the canvas format graphical display data is associated with the first unique identifier;
retrieving the first SVG component from the SVG map using the first unique identifier and the SVG map; and
replacing the first converted canvas component from the canvas format graphical display data with the first SVG component.

7. The apparatus of claim 6, the operations further comprising initializing the SVG map to store each SVG component and a corresponding unique identifier.

8. The apparatus of claim 7, the operations further comprising storing each SVG component and the corresponding unique identifier in the SVG map.

9. The apparatus of claim 7, the operations further comprising initializing a canvas map to store each canvas component.

10. The apparatus of claim 6, wherein the one or more SVG components are vector-based and the first converted canvas component is raster-based.

11. A non-transitory machine-readable storage medium comprising instructions, which when implemented by one or more machines, cause the one or more machines to perform operations comprising:
identifying one or more SVG components of graphical display data containing the one or more SVG components and one or more non-SVG components;
generating a first converted canvas component corresponding to a first SVG component of the one or more SVG components;
replacing the first SVG component of the graphical display data with the first converted canvas component to generate revised graphical display data;
storing the first SVG component to an SVG map in association with a first unique identifier;
converting the revised graphical display data to canvas format graphical display data;
identifying the first converted canvas component in the canvas format graphical display data;
determining that the first converted canvas component at the canvas format graphical display data is associated with the first unique identifier;
retrieving the first SVG component from the SVG map using the first unique identifier and the SVG map; and
replacing the first converted canvas component from the canvas format graphical display data with the first SVG component.

12. The non-transitory machine-readable storage medium of claim 11, the operations further comprising initializing SVG map to store each SVG component and a corresponding unique identifier.

13. The non-transitory machine-readable storage medium of claim 12, the operations further comprising initializing a canvas map to store each canvas component.

14. The non-transitory machine-readable storage medium of claim 13, the operations further comprising
storing the first converted canvas component in the canvas map with the first unique identifier, wherein determining that the first converted canvas component is associated with the first unique identifier comprises determining that the first converted canvas component is associated with the first unique identifier at the canvas map.

* * * * *